United States Patent Office 3,647,823
Patented Mar. 7, 1972

1

3,647,823
OXA-POLYCYCLIC DIOLS AND PROCESS FOR PREPARING THE SAME
Arsene Isard, St. Genis Laval, and Francis Weiss, Pierre Benite, France, assignors to Ugine Kuhlmann, Paris, France
No Drawing. Filed Jan. 4, 1968, Ser. No. 695,572
Claims priority, application France, Jan. 6, 1967, 90,194
Int. Cl. C07d 5/04
U.S. Cl. 260—347.8                           9 Claims

ABSTRACT OF THE DISCLOSURE 4-hydroxy-1-methylol-6-oxa (3.2.1)-bicyclo-octane, 4-hydroxy - 1 - methylol-6-oxa (3.2.1.1$^{3,8}$)-tricyclo-nonane, and 4-hydroxy-1-methylol-6,8-dioxa (3.2.1)-bicyclo-octane are prepared by reacting in the presence of a catalyst such as tungstic acid, a peracid with a cyclic diol such as 1,1 - dimethylol-3-cyclohexene, 2,2-dimethylol-5-norbornene, 2,2-dimethylol-3,4-dihydro (2H) pyrane. The peracid may be prepared in situ by reacting hydrogen peroxide with a carboxylic acid.

FIELD OF THE INVENTION

This invention relates to polycyclic diols and the method for preparing the same.

SUMMARY OF THE INVENTION

Polycyclic diols of the formula

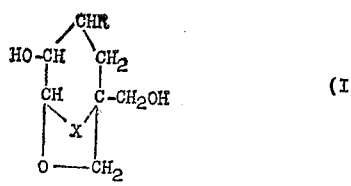

wherein R is a hydrogen atom, X is the group —CHR'— or an oxygen atom in which R' is a hydrogen atom or together with R forms a methylene bridge —CH$_2$—, is prepared by reacting an epoxydation or a hydroxylation agent such as a carboxylic peracid or an inorganic peracid with a cyclic diol of the formula

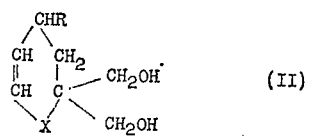

wherein R and X each has the same meaning as defined hereinabove. The suitable unsaturated cyclic diols are 1,1 - dimethylol-3-cyclohexene, 2,2-dimethylol-5-norbornene, and 2,2-dimethylol-3,4-dihydro (2H) pyrane.

DESCRIPTION OF THE PREFERRED EMBODIMENTS

We have observed that by reacting a conventional epoxydation or hydroxylation agent with an unsaturated cyclic diol of the Formula II, the epoxide or the dihydroxy derivative on the double bond, which normally was to be expected was practically non-separable and was transformed spontaneously during the reaction to yield polycyclic diols of this invention. Preferably, the reaction is carried out by reacting the unsaturated diol with a carboxylic peracid or an inorganic peracid. The carboxylic peracids suitable for the reaction include performic acid, peracetic acid, perbenzoic acid, p-nitroperbenzoic acid, metachloroperbenzoic acid, monopermaleic acid, monoperphthalic acid. The preferred inorganic acid includes persulfuric acid and Caro's acid.

2

Advantageously, the carboxylic peracid used in the reaction may be prepared in situ by adding hydrogen peroxide to a reaction mixture containing a suitable carboxylic acid such as formic acid or acetic acid, or a diacid anhydride such as maleic anhydride or phthalic anhydride, and the unsaturated cyclic diol. The preferred process comprises treating the diol with hydrogen peroxide in an aqueous medium at a temperature in the range between 30° and 70° C., and in the presence of an inorganic catalyst such as osmium tetroxide, tungstic acid, acid sodium tungstate, molybdic acid. In this preferred form of the process, the required amount of hydrogen peroxide, which may be in the form of commercial peroxides containing 30% to 80% by weight of H$_2$O$_2$ in an aqueous solution, and is used in the range between 1 to 1.5 mol of H$_2$O$_2$ per mol of the cyclic diol, is added to a solution of the cyclic diol in the presence of the suitable catalyst, and the reaction is allowed to react to completion. Thereafter the catalyst is removed by filtration and the excess solvent in the filtrate is evaporated. The polycyclic diol of this invention is recovered by either distilling under reduced pressure or by crystallization. The solution of the cyclic diol preferably is water or an aqueous mixture containing inert water miscible inert solvent such as methyl alcohol, ethyl alcohol, isopropanol and dioxane.

The temperature for the reaction may be varied within the range of 30° to 100° C. Preferably it is maintained substantially in the same temperature between 50° and 80° C. It is also possible to react at a temperature in the range between 30° to 70° C. at the first part of the reaction and thereafter allowing the temperature to reach to the temperature in the range between 70° C. and the boiling point of the reaction mixture.

The amount of catalyst that may be used to promote the reaction when hydrogen peroxide is used may vary within a wide range. In general, the amount required is within the limit of from trace amount to about 20 mol percent of the cyclic diol used in the reaction. Using tungstic acid, for example, the optimum quantity of catalyst is of about 1 to 10 mol percent of the cyclic diol.

The concentration of the cyclic diol in the reaction medium is not critical; it is generally limited by its solubility in the reaction medium, particularly if water is used alone. It is, however, not essential that all the cyclic diol is dissolved in the reaction medium at the start of the reaction. The dissolution may be continuous during the reaction. We prefer to use about 2 to 20 parts by weight of solvent per part of the cyclic diol to prepare the reaction solution.

The polycyclic diols of this invention may be used as hygroscopic agents, as solvents or dispersion agents for pigments, as starting materials for the production of polyesters or polyurethanes, for the production of paints and synthetic fibers.

Further to illustrate this invention, specific examples are described hereinbelow.

EXAMPLE 1

Production of 4-hydroxy 1-methylol 6-oxa bicyclo (3.2.1)octane

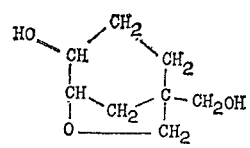

57 g. of 1,1-dimethylol 3-cyclohexene (0.4 mol) and 2.3 g. of tungstic acid (0.01 mol) were dissolved in 400 g. of water at 60° C., after which 40 g. of aqueous solution at 34% by weight of hydrogen peroxide (being 0.4 mol of H$_2$O$_2$) was added in 15 minutes. The mixture was stirred for an hour at the same temperature. Additional 10 g. of solution at 34% of $H_2O_2$ (0.1 mol) was added to the solution and the temperature was maintained at 60° C. for another hour, after which the mixture was brought to boiling point for 30 minutes. After cooling, the catalyst was filtered, and the filtrate was concentrated by evaporation of the water under the vacuum of a water siphon. Distillation was performed finally under a pressure of about 1 mm. of mercury. 43 g. of 4-hydroxy 1-methylol 6-oxa bicyclo (3.2.1) octane (0.27 mol) was obtained, to provide a yield of 67.5% based on the dimethylol-cyclohexene used.

The product is a very viscous colorless liquid having $B.P._1=146-153°$ C. and $n_D^{20}=1.510$, and is very soluble in water.

Analysis by acetylation with acetic anhydride indicated an —OH equivalent of 1.21 per 100 g., for a theoretical value of 1.26. This product yields a crystallized p-nitrobenzoic di-ester, melting point at 147–148° C., containing 6.14% of nitrogen (theoretical 6.14) and a crystallized 3,5-dinitrobenzoic diester, melting at 200–201° C., containing 9.96% of nitrogen (theoretical 10.25).

EXAMPLE 2

Production of 4-hydroxy 1-methylol 6-oxa tricyclo $(3.2.1.1^{3,8})$ nonane

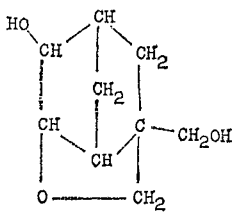

77 g. of 2,2-dimethylol 5-norbornene (0.5 mol) and 2.5 g. of tungstic acid (0.01 mol) were dissolved in 500 g. of water at 55° C., after which 70 g. of aqueous solution at 34% by weight of hydrogen peroxide (0.7 mol of $H_2O_2$) was added in 35 minutes. Thereafter the mixture was maintained at the same temperature for half an hour before it was raised to the boiling point of the mixture for another half an hour. After it was cool, the catalyst was filtered, and the excess water was evaporated by heating under the vacuum of a water siphon. The reaction product after concentration was distilled under a pressure of 0.5 to 1 mm. of mercury. 64 g. distilled at 150° C., which largely crystallized at ambient temperature, was recovered consisting of approximately 82% of 4-hydroxy 1-methylol 6-oxa tricyclo $(3.2.1.1^{3,8})$ nonane (52.5 g.=0.31 mol, or a yield of 62% based on the amount of cyclic diol used), 14% of the unconverted 2,2-dimethylol-5-norbornene, and traces of 1-methylol-6-oxa-tricyclo $(3.2.1.1^{3,8})$ nonane.

8 g. of a non-distillable residue remained which was very soluble in water. The residue was probably a mixture of the normally expected tetrol, 5,6-dihydroxy 2,2-dimethylol norbornane, and hydroxylated polycondensation products.

The distillate was treated with 200 g. of a mixture of benzenes and acetone, in the hot condition, to purify the reaction product. A colorless crystalline precipitate was obtained by cooling, which was filtered, washed with cold benzene and dried. The dry weight was 46 g. This was pure 4-hydroxy-1-methylol 6-oxa tricyclo $(3.2.1.1^{3,8})$ nonane (purity verified by liquid chromatography in an attenuated layer) in the form of crystals melting at 92–93° C.

Analyses: 1.14 OH/100 g. (theoretical: 1.175) was determined by acetylation. The bis (3,5-dinitrobenzoic) ester, crystals melting at 211–212° C., contained 9.80% of nitrogen (theoretical 10.03).

We claim:
1. The polycyclic diol 4-hydroxy-1-methylol-6-oxa (3.2.1)-bicyclo-octane.
2. A process for preparing a polycyclic diol of the formula

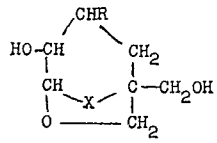

wherein R is a hydrogen atom, X is the group —CHR'— or an oxygen atom in which R' is a hydrogen atom or together with R forms a methylene bridge, which method comprises reacting epoxydation or hydroxylation agent with an unsaturated cyclic diol of the formula

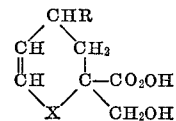

wherein X and R each has the same meaning as identified above, and recovering the polycyclic diol therefrom.

3. A process according to claim 2 wherein the epoxidation or the hydroxylation agent is carboxylic peracid or inorganic peracid.

4. A process according to claim 2 wherein the carboxylic peracid is prepared in situ by reacting hydrogen peroxide in the presence of catalyst and said cyclic diol, the amount of hydrogen peroxide used being about 1 to 1.5 mol of the cyclic diol.

5. A process according to claim 4 wherein the reaction is carried out in an aqueous medium at a temperature between 30 and 100° C. and said catalyst is osmium tetroxide, tungstic acid, acid sodium tungstate, molybdic acid in an amount equal to about 1 to 10 mol percent of the cyclic diol.

6. A process according to claim 5 wherein the aqueous medium used is in the range of 2 to 20 parts by weight of solvent per part of the cyclic diol.

7. A process according to claim 3 wherein the reaction is carried out in the presence of an aqueous medium or a solvent selected from methyl alcohol, ethyl alcohol, isopropanol and dioxane.

8. A process according to claim 7 wherein the reaction is maintained at a substantially constant temperature in the range between 50° and 80° C.

9. A process according to claim 7 wherein the reaction is initially carried out at a temperature in the range between 30° and 70° C. and thereafter allowing the temperature to be raised to the range between 70° C. and the boiling point of the reaction mixture.

References Cited
UNITED STATES PATENTS 2,980,703   4/1961   Dunlop et al. _____ 260—345.9
3,047,586   7/1962   Dunlop et al. _____ 260—340.9

ALEX MAZEL, Primary Examiner

J. H. TURNIPSEED, Assistant Examiner

U.S. Cl. X.R.

260—340.9; 346.2